US012732814B2

(12) United States Patent
Choyi et al.

(10) Patent No.: US 12,732,814 B2
(45) Date of Patent: Sep. 8, 2026

(54) SYSTEMS AND METHODS FOR NETWORK FUNCTION AUTHORIZATION FOR ROAMING BETWEEN PUBLIC LAND MOBILE NETWORKS

(71) Applicant: Verizon Patent and Licensing Inc., Basking Ridge, NJ (US)

(72) Inventors: Vinod Kumar Choyi, Conshohocken, PA (US); Shanthala Kuravangi-Thammaiah, Keller, TX (US); Robert Avanes, Roanoke, TX (US); Hossein M. Ahmadi, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 282 days.

(21) Appl. No.: 18/662,165

(22) Filed: May 13, 2024

(65) Prior Publication Data

US 2025/0350944 A1 Nov. 13, 2025

(51) Int. Cl.

| | |
|---|---|
| ***H04W 12/069*** | (2021.01) |
| ***H04L 9/40*** | (2022.01) |
| ***H04W 12/30*** | (2021.01) |
| *H04W 84/04* | (2009.01) |

(52) U.S. Cl.
CPC ....... *H04W 12/069* (2021.01); *H04L 63/0807* (2013.01); *H04W 12/35* (2021.01); *H04W 84/042* (2013.01)

(58) Field of Classification Search
CPC . H04W 12/069; H04W 12/35; H04W 84/042; H04L 63/0807; H04L 63/0823
See application file for complete search history.

(56) References Cited

U.S. PATENT DOCUMENTS

| | | | | |
|---|---|---|---|---|
| 12,495,095 | B2 * | 12/2025 | Bommisetty | G06F 21/645 |
| 2025/0063362 | A1 * | 2/2025 | Khare | H04W 12/084 |
| 2025/0175801 | A1 * | 5/2025 | Kadyan | H04W 12/06 |

* cited by examiner

*Primary Examiner* — Kabir A Timory

(57) ABSTRACT

In some implementations, a device in a first public land mobile network (PLMN) may receive a request for services with a network function producer (NF-P) in the first PLMN, wherein the request for services includes a first token that is associated with a network function consumer (NF-C) in a second PLMN. The device may validate the first token using a signing certificate associated with a signer of the first token. The device may transmit the request for services to the NF-P, wherein the request for services includes a second token that is based on a successful validation of the first token, and a successful validation of the second token enables the NF-P to provide a service to the NF-C based on an authorization of the NF-C during an inter-PLMN roaming.

20 Claims, 8 Drawing Sheets

Figure 2:
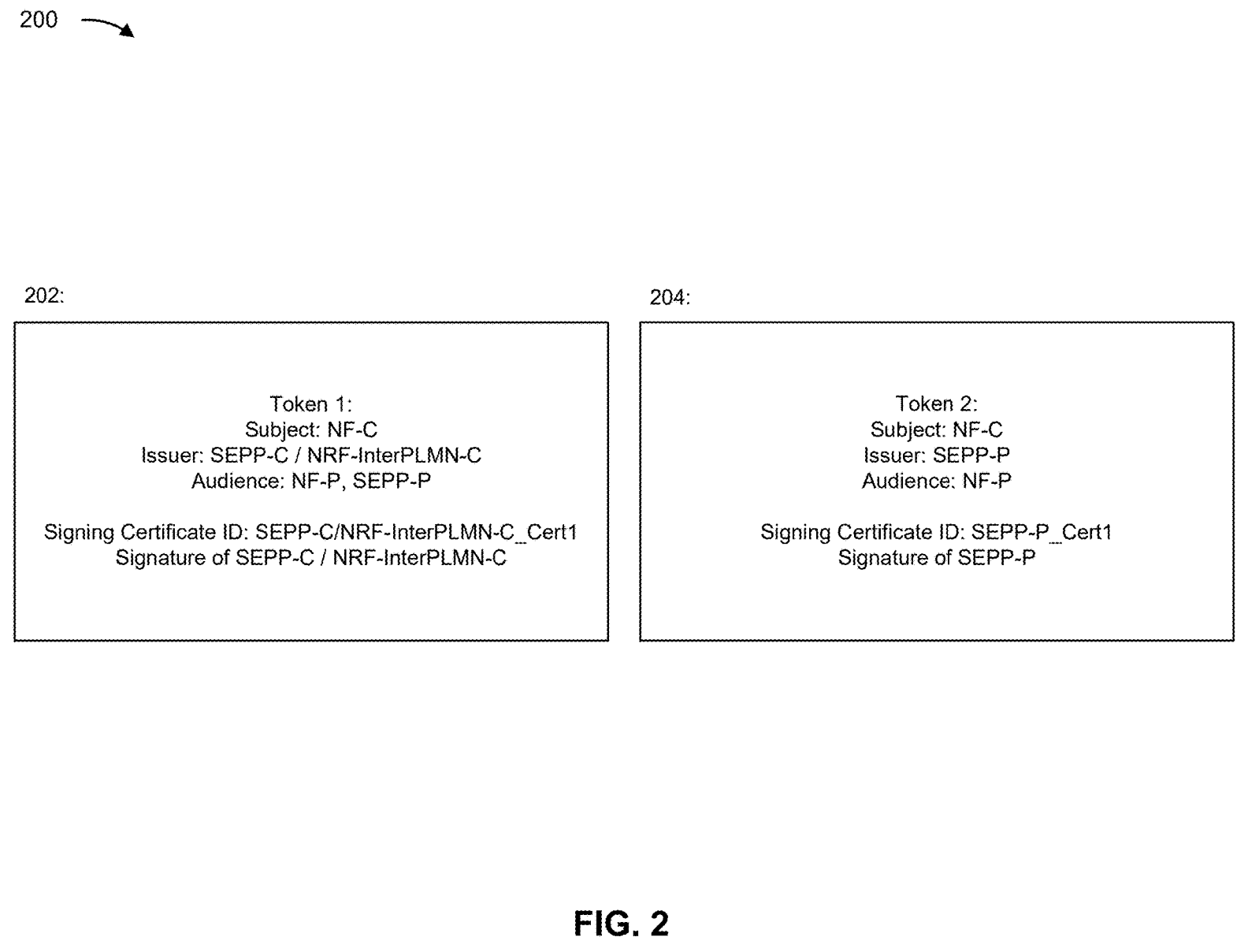

200

202:

Token 1:
Subject: NF-C
Issuer: SEPP-C / NRF-InterPLMN-C
Audience: NF-P, SEPP-P

Signing Certificate ID: SEPP-C/NRF-InterPLMN-C_Cert1
Signature of SEPP-C / NRF-InterPLMN-C

204:

Token 2:
Subject: NF-C
Issuer: SEPP-P
Audience: NF-P

Signing Certificate ID: SEPP-P_Cert1
Signature of SEPP-P

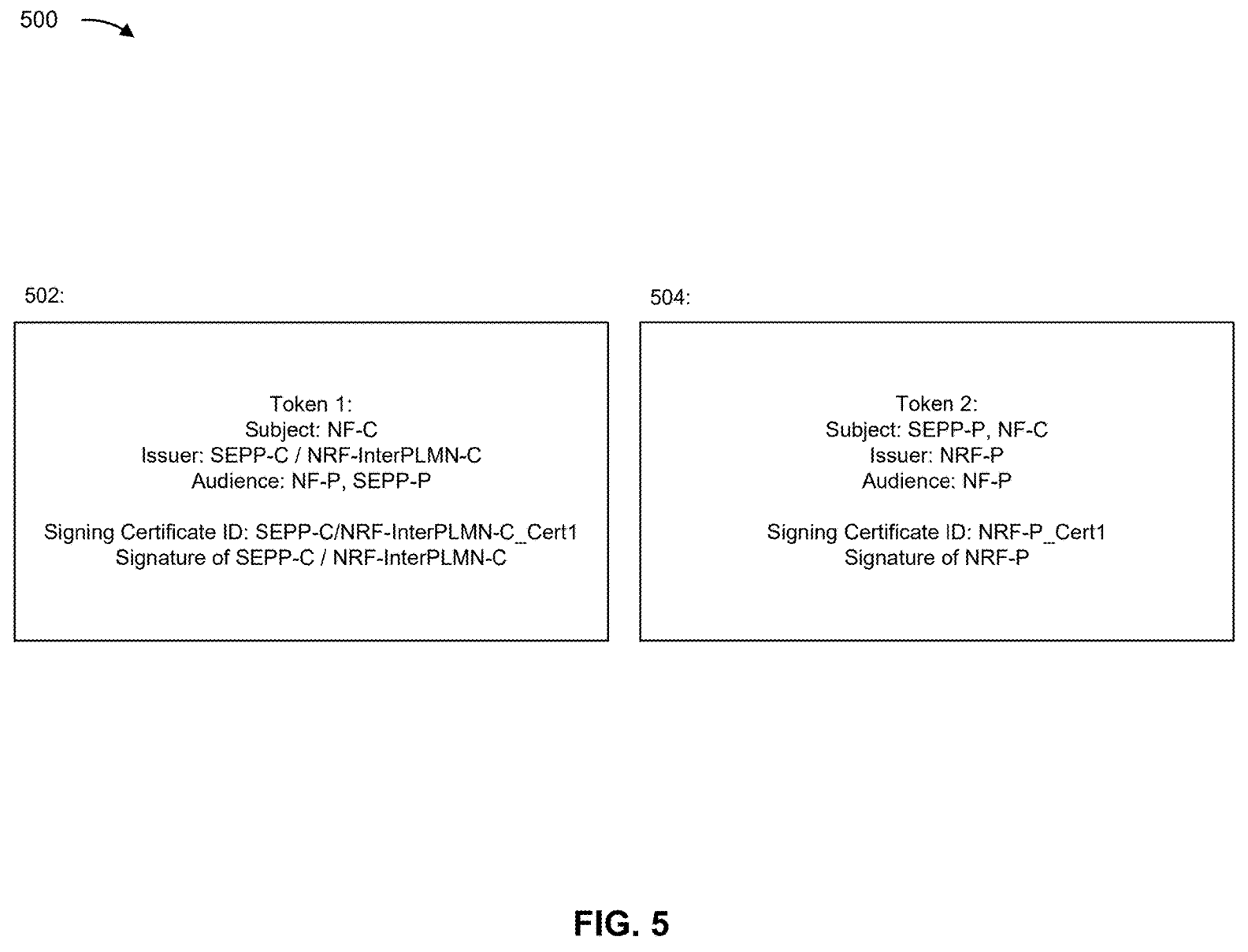

Token 1:
Subject: NF-C
Issuer: SEPP-C / NRF-InterPLMN-C
Audience: NF-P, SEPP-P

Signing Certificate ID: SEPP-C/NRF-InterPLMN-C_Cert1
Signature of SEPP-C / NRF-InterPLMN-C

504:

Token 2:
Subject: SEPP-P, NF-C
Issuer: NRF-P
Audience: NF-P

Signing Certificate ID: NRF-P_Cert1
Signature of NRF-P

FIG. 5

SYSTEMS AND METHODS FOR NETWORK FUNCTION AUTHORIZATION FOR ROAMING BETWEEN PUBLIC LAND MOBILE NETWORKS

BACKGROUND

Communication systems are widely deployed to provide various telecommunication services such as telephony, video, data, messaging, and broadcasts. A network may include one or more network nodes that support communication for wireless communication devices.

BRIEF DESCRIPTION OF THE DRAWINGS

FIG. 2 is a diagram of an example associated with NF authorization for roaming between PLMNs.

FIG. 3 is a diagram of an example associated with NF authorization for roaming between PLMNs.

FIG. 5 is a diagram of an example associated with NF authorization for roaming between PLMNs.

DETAILED DESCRIPTION OF EXAMPLE EMBODIMENTS

Figure 1:
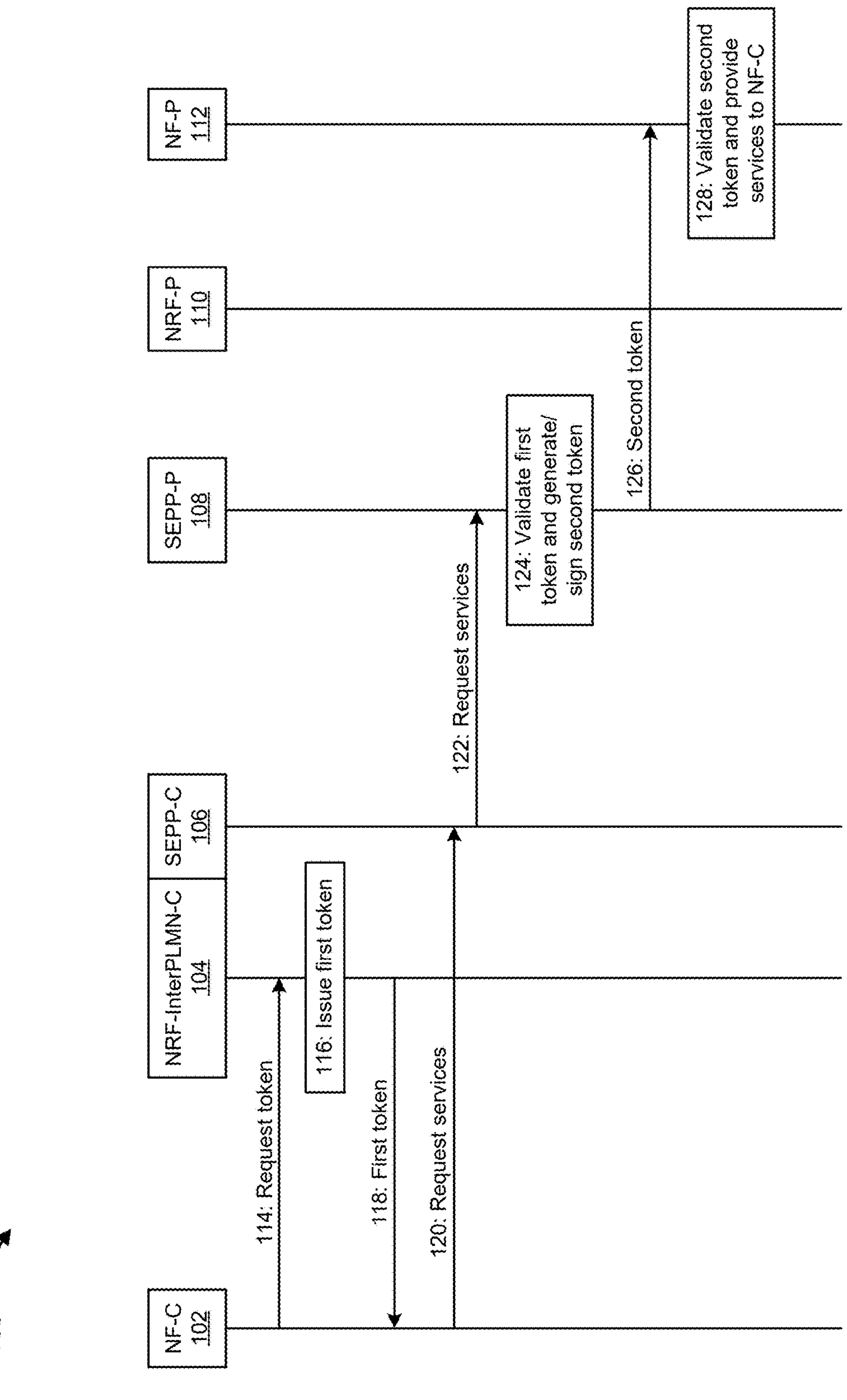
FIG. 1 is a flow diagram of an example associated with network function (NF) authorization for roaming between public land mobile networks (PLMNs).

The following detailed description of example implementations refers to the accompanying drawings. The same reference numbers in different drawings may identify the same or similar elements.

An authorization between NFs in a PLMN (e.g., intra-PLMN authorization without roaming support) may be performed using tokens. In one example, the tokens are open authorization (OAuth) 2.0 tokens. The NFs may include a network function consumer (NF-C) and a network function producer (NF-P). The NF-P may provide a service, and the NF-C may consume the service provided by the NF-P. An authorization procedure may involve the NF-C obtaining a token from a network repository function (NRF). The NRF may issue the token to the NF-C based on authorization rules. The NRF may digitally sign the token using a private key associated with the NRF. The NF-C may present the token to the NF-P in order to access the service provided by the NF-P. The NF-P may validate an authenticity of the token based on a digital signature verification. The NF-P may perform the digital signature verification using a certificate and/or public key of the NRF that issued the token. The certificate and/or public key of the NRF (e.g., an NRF certificate/public key) that is used by the NF-P for validation of the token may be pre-provisioned into the NF-P. In certain implementations, a side-car proxy (e.g., a cloud based container in an open-source container orchestration system) that is associated with the NF-P may perform the validation on behalf of the NF-P.

The authorization procedure may further involve verifying whether the NF-C and the NF-P have been authorized to use and provide services, respectively. The authorization procedure may further involve verifying that the token has not expired. The authorization procedure may further involve providing only services that have been described in a scope field (e.g., no services that are not explicitly described in the scope field). In other words, the token may allow only certain services to be consumed by the NF-C. After the authorization procedure, the NF-P may provide the service for an amount of time for which the token is valid.

In an inter-PLMN roaming scenario, authorization may be complex from a trust-domain perspective, as well as from a scalability/performance perspective. In the inter-PLMN roaming scenario, which may involve up to hundreds of roaming partners, pre-provisioning certificates and/or public keys associated with each NRF of the roaming partners into every relevant NF-P may be difficult. The pre-provisioning of the certificates and/or public keys into the NF-P may not be an issue for intra-PLMN authorization, but the pre-provisioning of the certificates and/or public keys may be overly complicated for inter-PLMN authorization that involves roaming due to the large number of NRFs associated with the hundreds of roaming partners that may be generally located outside of a country's geographic boundary.

In the inter-PLMN roaming scenario, the NF-P may validate a token provided by the NF-C. The validation of the token may be overly burdensome for the NF-P due to the complexity involved with the pre-provisioning of the certificates and/or public keys into the NF-P. The validation may involve the digital signature verification, which may involve intensive cryptographical operations. The intensive cryptographical operations, coupled with the processing needed for the pre-provisioning of the certificates and/or public keys into the NF-P, may negatively affect a performance of the NF-P. Further, revocation, updates, and other lifecycle management actions of certificates and/or public keys associated with NRFs of roaming partners may be overly complicated, which may possibly lead to insecure solutions.

In some implementations, an NF authorization for inter-PLMN roaming may be based on a solution involving a security edge protection proxy (SEPP). The SEPP may be an entry point into a particular roaming network. The SEPP may be a Fifth Generation (5G) entity that terminates secure connections between roaming partners. The SEPP may act as a signaling firewall between the roaming partners. In some implementations, a SEPP consumer (SEPP-C) may act as an inter-PLMN token generation/provisioning authority, and a SEPP producer (SEPP-P) may act as an inter-PLMN token validation authority. The SEPP-C, or an NRF inter-PLMN consumer (NRF-InterPLMN-C) (e.g., an NRF dedicated for the generation of inter-PLMN tokens) may be an entity associated with a roaming partner that is able to issue tokens. The SEPP-C, or the NRF-InterPLMN-C, may issue a token with a SEPP-P as an audience "aud" field. The audience field may also include a NF-P and an NF-P type. The SEPP-C, or the NRF inter-PLMN consumer, may digitally sign the token. The SEPP-P may validate a signature of the token and an expiration of the token. The SEPP-P may be pre-provisioned with a SEPP-C signing certificate (or public key) or an NRF-InterPLMN-C signing certificate (or public key). The SEPP-P may be the only entity in a PLMN that manages all of the certificates associated with a signing authority in the roaming partner, where the signing authority may be the SEPP-C or the NRF-InterPLMN-C. The SEPP-P may be the only entity in the PLMN that manages all certificates for all roaming partners.

In some implementations, by employing the SEPP-C and the SEPP-P in an NF authorization for inter-PLMN roaming, NFs in a roaming partner may not need to be relied on to provide tokens, and NFs may not need to be used to validate the tokens. NFs may not be required to have certificates associated with each NRF in the roaming partner to be pre-provisioned, which would otherwise affect an NF performance. By employing the SEPP-C and the SEPP-P in the NF authorization for inter-PLMN roaming, NFs may be relived from performing intensive cryptographical operations, such as signature validation, because such operations may be offloaded to the SEPP-P. Offloading the NF authorization to the SEPP-C and the SEPP-P may improve an overall authorization process and reduce a load on NFs, thereby improving an overall system performance. Offloading the NF authorization to the SEPP-C and the SEPP-P may improve service delivery and security since the NFs do not have to handle expired and revoked certificates and associated public keys with roaming partners.

FIG. 1 is a flow diagram of an example 100 associated with NF authorization for roaming between PLMNs. As shown in FIG. 1, example 100 includes an NF-C 102, an NRF-InterPLMN-C 104, a SEPP-C 106, a SEPP-P 108, an NRF producer (NRF-P) 110, and an NF-P 112. The NF-C 102, the NRF-InterPLMN-C 104, and the SEPP-C 106 may be associated with a second roaming partner. The NRF-InterPLMN-C 104 may be co-located with the SEPP-C 106. The SEPP-P 108, the NRF-P 110, and the NF-P 112 may be associated with a first roaming partner. The first roaming partner may be associated with a first PLMN. The second roaming partner may be associated with a second PLMN.

As shown by reference number 114, the NF-C 102 may transmit, to the NRF-InterPLMN-C 104 (or to the SEPP-C 106), a request for a token for the NF-P 112 in the first roaming partner. The NF-C 102 may obtain a roaming partner identity (e.g., a mobile country code and/or a mobile network code) using an International Mobile Subscriber Identifier (IMSI/SUPI) or a Subscriber Concealed Identifier (SUCI) associated with a roaming user equipment (UE). The roaming UE may belong to the first roaming partner and may be shared by the roaming UE as part of a registration process with the second roaming partner. As shown by reference number 116, the NRF-InterPLMN-C 104 (or the SEPP-C 106) may determine that the NF-P 112 belongs to a different PLMN, and the NRF-InterPLMN-C 104 (or the SEPP-C 106) may issue a first token with the SEPP-P 108 as an additional "audience" within an OAuth token field. The first token is further described with respect to FIG. 2. The NRF-InterPLMN-C 104 may digitally sign the first token using a private key associated with the NRF-InterPLMN-C signing certificate. Alternatively, the SEPP-C 106 may digitally sign the first token using a SEPP-C signing certificate. In other words, the first token may include an NRF-InterPLMN-C signature and/or a SEPP-C signature.

As shown by reference number 118, the NRF-InterPLMN-C 104 (or the SEPP-C 106) may transmit the first token to the NF-C 102. As shown by reference number 120, the NF-C 102 may transmit, to the SEPP-C 106, a request for services with the NF-P 112, where the request for services may include the first token. As shown by reference number 122, the SEPP-C 106 may forward the request for services (including the first token) to the SEPP-P 108. The SEPP-C 106 may forward the request for services (including the first token) using mutual transport layer security (mTLS) or protocol for N32 interconnect security (PRINS). The SEPP-P 108 may be pre-provisioned with the NRF-InterPLMN-C signing certificate and/or the SEPP-C signing certificate or a public key.

As shown by reference number 124, the SEPP-P 108 may validate the first token using the NRF-InterPLMN-C signing certificate and/or the SEPP-C signing certificate. The SEPP-P 108 may generate and sign a second token with only the NF-P 112 as an audience. The second token is further described with respect to FIG. 3. The SEPP-P 108 may digitally sign the second token using a private key associated with the SEPP-P signing certificate. As shown by reference number 126, the SEPP-P 108 may forward the request for services (including the second token) to the NF-P 112. The SEPP-P 108 may optionally include the first token. The NF-P 112 may be pre-provisioned with the SEPP-P signing certificate. The NF-P 112 may also be pre-provisioned with NRF-P certificates. As shown by reference number 128, the NF-P 112 may validate the second token using the SEPP-P signing certificate and other parameters in the second token. The NF-P 112 may provide appropriate services to the NF-C 102 based on a successful validation of the second token. In some cases, the NF-P 112 may check, but not validate, the first token. In certain cases, the NF-P 112 may also validate the first token in case the NF-P 112 has been pre-provisioned with a valid certificate or public key associated with the NRF-InterPLMN-C 104 or SEPP-C 106. The NF-P 112 may validate the first token when a security policy determines that the NF-P 112 validate the first token based on a risk profile associated with services that are offered by the NF-P 112.

Figure 3:
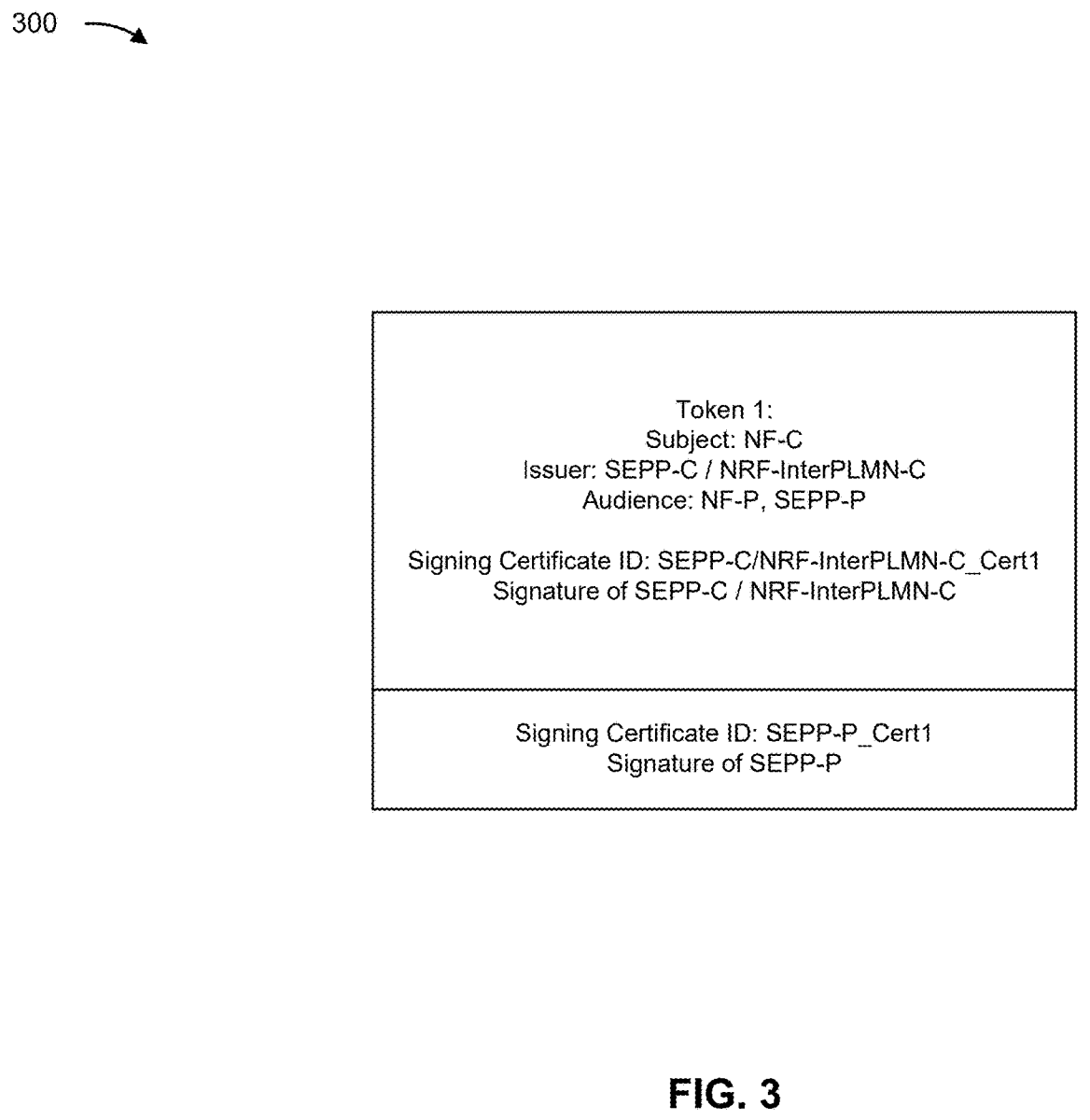

In some implementations, a single token with a concatenated signature (e.g., as shown in FIG. 3) may be employed, instead of using both the first token and the second token. In this example, the SEPP-P 108 may receive the first token from the SEPP-C 106. The SEPP-P 108 may not issue the second token. Rather, the SEPP-P 108 may generate and patch the first token (e.g., an original token) with a new signature. The new signature may be generated by the SEPP-P 108 using the private key associated with the SEPP-P signing certificate. The new signature may be a SEPP-P signature, which may be an additional signature that is added to the first token. The additional signature may be based on a JavaScript Object Notation (JSON) update or JSON patch. The first token may also still contain the NRF-InterPLMN-C signature or the SEPP-C signature. The SEPP-P 108 may transmit the first token with the SEPP-P signature to the NF-P 112. The NF-P 112 may only validate the SEPP-P signature and an expiration of the first token. The NF-P 112 may not validate the NRF-InterPLMN-C signature or the SEPP-C signature. In some cases, the NF-P 112 may optionally validate the NRF-InterPLMN-C signature or the SEPP-C signature based on security policies and the risk profile associated with the services that are offered by the NF-P 112.

In some implementations, the SEPP-P 108 may negotiate with the NRF-InterPLMN-C 104 and/or the SEPP-C 106 to provide tokens that are able to be validated based on token requirements within a PLMN. A negotiation may involve an agreement on certain cryptographic algorithms that are to be used when generating tokens (e.g., P-256 or P-384). The SEPP-P 108 may also negotiate in case a roaming partner does not use any tokens. In this case, the SEPP-P 108 may use an external third party to generate tokens on a roaming partner's behalf. For example, the external third party may generate tokens on behalf of the SEPP-C 106, where the SEPP-C 106 and the SEPP-P 108 may be associated with different PLMNs.

In some implementations, different roaming partners may use different types of cryptographic approaches, and the different roaming partners should be able to coexist with each other in such a scenario. For example, the second roaming partner may use a second type of cryptographic algorithm when generating the token. The second roaming partner may generate the token using the second type of cryptographic algorithm, and then send the token to the first roaming partner. The first roaming partner may typically use a first type of cryptographic algorithm (e.g., as a default), but the first roaming partner should still be able to support the second type of cryptographic algorithm. In other words, the first roaming partner should be able to translate the token received from the second roaming partner, such that the token is useable by the first roaming partner.

As an example, the NF-C 102 associated with the second roaming partner may support P-256, the NF-P 112 associated with the first roaming partner may support P-384, and the SEPP-P 108 associated with the first roaming partner may support both P-256 and P-384. When the NF-C 102 presents the first token using P-256, the SEPP-P 108 may be able to validate the first token because the SEPP-P 108 may support both P-256 and P-384. The SEPP-P 108 may validate the first token using P-256. When the SEPP-P 108 generates the second token, the SEPP-P 108 may use P-384, which may be readable by the NF-P 112. The SEPP-P 108 may negotiate with the SEPP-C 106 regarding the usage of P-256 and/or P-384 based tokens, such that the SEPP-P 108 is able to perform translations of tokens received from the NF-C 102 via the SEPP-C 106. For example, negotiations may define that only certain types of cryptographic algorithms are to be used by the second roaming network, and these types of cryptographic algorithms may be defined in a service level agreement (SLA).

In some implementations, certain roaming partners may not use tokens at all for authorization. Rather, these certain roaming partners may utilize implicit authorization or implied authorization. When no tokens are used, the external third party may be used to generate tokens on the roaming partner's behalf. In this case, the roaming party themselves do not generate tokens, but rather may rely on the external third party, which may offer token generation and/or provisioning as a service. Further, some trustworthiness of the roaming partner may be taken into account, in addition to the external third party that is able to generate tokens on behalf of the roaming party.

As an example, the NF-C 102 may transmit, to the SEPP-C 106, a request for services with the NF-P 112. The SEPP-C 106 may determine that the NF-P 112 is associated with the different PLMN, in relation to the NF-C 102. The SEPP-C 106 may be unable to generate the first token by itself, but rather may send a request to the external third party. The external third party may generate the first token on behalf of the SEPP-C 106. The external third party may transmit the first token to the SEPP-C 106. The SEPP-C 106 may then send the first token to the NF-C 102. The SEPP-C 106 may transmit the request for services, along with the first token, to the SEPP-P 108, and the SEPP-P 108 may validate the first token accordingly using a public key certificate associated with the external third party. A certificate and certificate chains associated with the external third party may have been either pre-provisioned or provided along with the first token using a JSON Web Key Set (JWKS). In certain cases, a JWK universal resource endpoint may be provided, which may then be used by the SEPP-P 108 to obtain the signing certificate associated with the external third party. In this example, the SEPP-C 106 (or possibly the NRF-InterPLMN-C) may utilize the external third party for token generation. From the perspective of the SEPP-P 108, whether the first token is generated by the SEPP-C 106 itself or by the external third party on behalf of the SEPP-C 106 may be not important, provided the external third party is part of a trust domain of the SEPP-P 108.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIG. 2 is a diagram of an example 200 associated with NF authorization for roaming between PLMNs.

As shown by reference number 202, a first token (e.g., as described with respect to FIG. 1) may indicate a subject (e.g., NF-C). The first token may indicate an issuer (e.g., NRF-InterPLMN-C or SEPP-C). The first token may indicate an audience (e.g., NF-P or SEPP-P). The first token may indicate a signing certificate identifier (e.g., NRF-InterPLMN-C signing certificate identifier or SEPP-C signing certificate identifier). The first token may indicate a digital signature of the NRF-InterPLMN-C generated using a private key associated with an NRF-InterPLMN-C certificate identified using the NRF-InterPLMN-C signing certificate identifier or a digital signature of the SEPP-C generated using a private key associated with a SEPP-C certificate identified using the SEPP-C signing certificate identifier, respectively.

As shown by reference number 204, a second token (e.g., as described with respect to FIG. 1) may indicate a subject (e.g., NF-C). The second token may indicate an issuer (e.g., SEPP-P). The second token may indicate an audience (e.g., NF-P). The second token may indicate a signing certificate identifier (e.g., SEPP-P signing certificate identifier). The second token may indicate a signature of the SEPP-P generated using a private key associated with the SEPP-P certificate, which may be identified using the SEPP-P signing certificate identifier.

As indicated above, FIG. 2 is provided as an example. Other examples may differ from what is described with regard to FIG. 2.

FIG. 3 is a diagram of an example 300 associated with NF authorization for roaming between PLMNs.

As shown in FIG. 3, a first token (e.g., as described with respect to FIG. 1) may indicate a subject (e.g., NF-C). The first token may indicate an issuer (e.g., NRF-InterPLMN-C or SEPP-C). The first token may indicate an audience (e.g., NF-P and/or SEPP-P). The first token may indicate a signing certificate identifier (e.g., NRF-InterPLMN-C signing certificate identifier or SEPP-C signing certificate identifier). The first token may indicate a signature of the NRF-InterPLMN-C generated using a private key associated with an NRF-InterPLMN-C certificate identified using the NRF-InterPLMN-C signing certificate identifier or a digital signature of the SEPP-C generated using a private key associated with a SEPP-C certificate identified using the SEPP-C signing certificate identifier, respectively. The first token may indicate an additional signing certificate identifier (e.g., SEPP-P signing certificate identifier). The first token may indicate an additional signature, which may be a signature of the SEPP-P that is generated using a private key associated with a SEPP-P certificate identified using the SEPP-P signing certificate identifier.

As indicated above, FIG. 3 is provided as an example. Other examples may differ from what is described with regard to FIG. 3.

Figure 4:
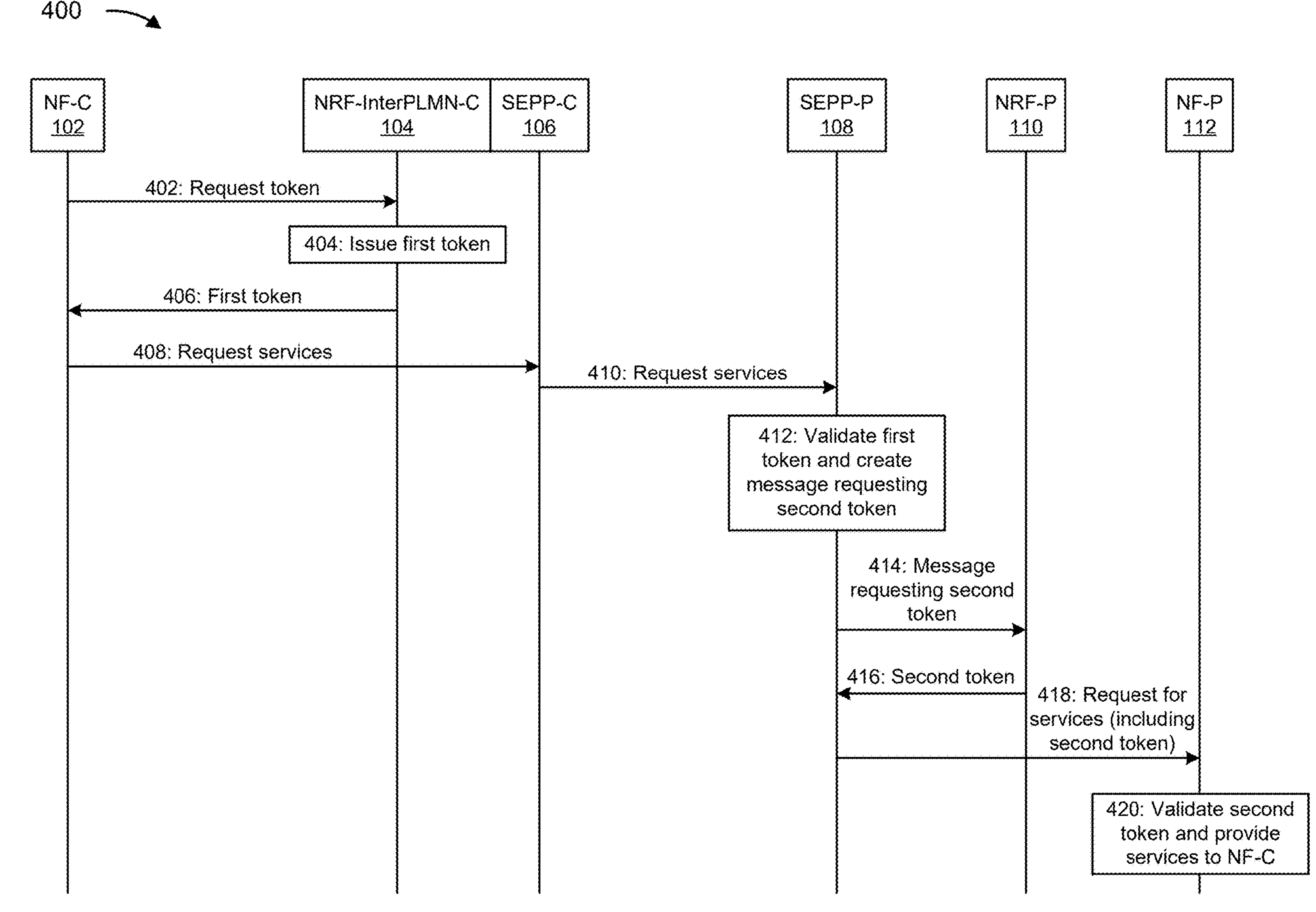
FIG. 4 is a flow diagram of an example associated with NF authorization for roaming between PLMNs.

FIG. 4 is a flow diagram of an example 400 associated with NF authorization for roaming between PLMNs. As shown in FIG. 4, example 400 includes an NF-C 102, an NRF-InterPLMN-C 104, a SEPP-C 106, a SEPP-P 108, an NRF-P 110, and an NF-P 112. The NF-C 102, the NRF-InterPLMN-C 104, and the SEPP-C 106 may be associated with a second roaming partner. The NRF-InterPLMN-C 104 may be co-located with the SEPP-C 106. The SEPP-P 108, the NRF-P 110, and the NF-P 112 may be associated with a first roaming partner.

As shown by reference number 402, the NF-C 102 may transmit, to the NRF-InterPLMN-C 104 (or to the SEPP-C 106), a request for a token for the NF-P 112 in the first roaming partner. As shown by reference number 404, the NRF-InterPLMN-C 104 (or the SEPP-C 106) may determine that the NF-P 112 belongs to a different PLMN, and the NRF-InterPLMN-C 104 (or the SEPP-C 106) may issue a first token with the SEPP-P 108 as an additional audience. The first token is further described with respect to FIG. 5. The NRF-InterPLMN-C 104 may digitally sign the first token using a private key associated with an NRF-InterPLMN-C signing certificate. Alternatively, the SEPP-C 106 may digitally sign the first token using a private key associated with a SEPP-C signing certificate. In other words, the first token may include an NRF-InterPLMN-C signature and/or a SEPP-C signature.

As shown by reference number 406, the NRF-InterPLMN-C 104 (or the SEPP-C 106) may transmit the first token to the NF-C 102. As shown by reference number 408, the NF-C 102 may transmit, to the SEPP-C 106, a request for services with the NF-P 112, where the request for services may include the first token. As shown by reference number 410, the SEPP-C 106 may forward the request for services (including the first token) to the SEPP-P 108. The SEPP-C 106 may forward the request for services (including the first token) using mTLS or PRINS. The SEPP-P 108 may be pre-provisioned with the NRF-InterPLMN-C signing certificate and/or the SEPP-C signing certificate. The SEPP-P 108 may also be pre-provisioned with NRF-P certificates.

As shown by reference number 412, the SEPP-P 108 may act as a proxy to the NRF-P 110. The SEPP-P 108 may validate the first token using the NRF-InterPLMN-C signing certificate and/or the SEPP-C signing certificate. The SEPP-P 108 may create a message requesting that a second token be created, where the second token is to define the SEPP-P 108 and optionally the NF-C 102 as subjects, and the second token is to define the NF-P 112 as an audience. As shown by reference number 414, the SEPP-P 108 may transmit, to the NRF-P 110, the message requesting that the second token be created. As shown by reference number 416, the NRF-P 110 may transmit, to the SEPP-P 108 and in response to the message, the second token. The NRF-P 110 may generate the second token and digitally sign the second token using a private key associated with an NRF-P signing certificate. The second token is further described with respect to FIG. 5. In this example, the SEPP-P 108 may not act as a token issuer (e.g., the SEPP-P 108 itself does not issue the second token). Rather, the SEPP-P 108 may request that the NRF-P 110 generate and digitally sign the second token. As shown by reference number 418, the SEPP-P 108 may forward the request for services (including the second token) to the NF-P 112. The SEPP-P 108 may optionally include the first token. The NF-P 112 may be pre-provisioned with the NRF-P signing certificate. As shown by reference number 420, the NF-P 112 may validate the second token using the NRF-P signing certificate and other parameters in the second token. The NF-P 112 may provide appropriate services to the NF-C 102 based on a successful validation of the second token. In some cases, the NF-P 112 may check, but not validate, the first token.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

FIG. 5 is a diagram of an example 500 associated with NF authorization for roaming between PLMNs.

As shown by reference number 502, a first token (e.g., as described with respect to FIG. 4) may indicate a subject (e.g., NF-C). The first token may indicate an issuer (e.g., NRF-InterPLMN-C or SEPP-C). The first token may indicate an audience (e.g., NF-P and/or SEPP-P). The first token may indicate a signing certificate identifier (e.g., NRF-InterPLMN-C signing certificate identifier or SEPP-C signing certificate identifier). The first token may indicate a signature of the NRF-InterPLMN-C that is generated using a private key identified using the NRF-InterPLMN-C certificate identifier or a signature of the SEPP-C that is generated using a private key identified using the SEPP-C certificate identifier.

As shown by reference number 504, a second token (e.g., as described with respect to FIG. 4) may indicate a subject (e.g., NF-C and/or SEPP-P). The second token may indicate an issuer (e.g., NRF-P). The second token may indicate an audience (e.g., NF-P). The second token may indicate a signing certificate identifier (e.g., NRF-P signing certificate identifier). The second token may indicate a signature of the NRF-P that is generated using a private key identified using the NRF-P signing certificate identifier.

As indicated above, FIG. 5 is provided as an example. Other examples may differ from what is described with regard to FIG. 5.

Figure 6:
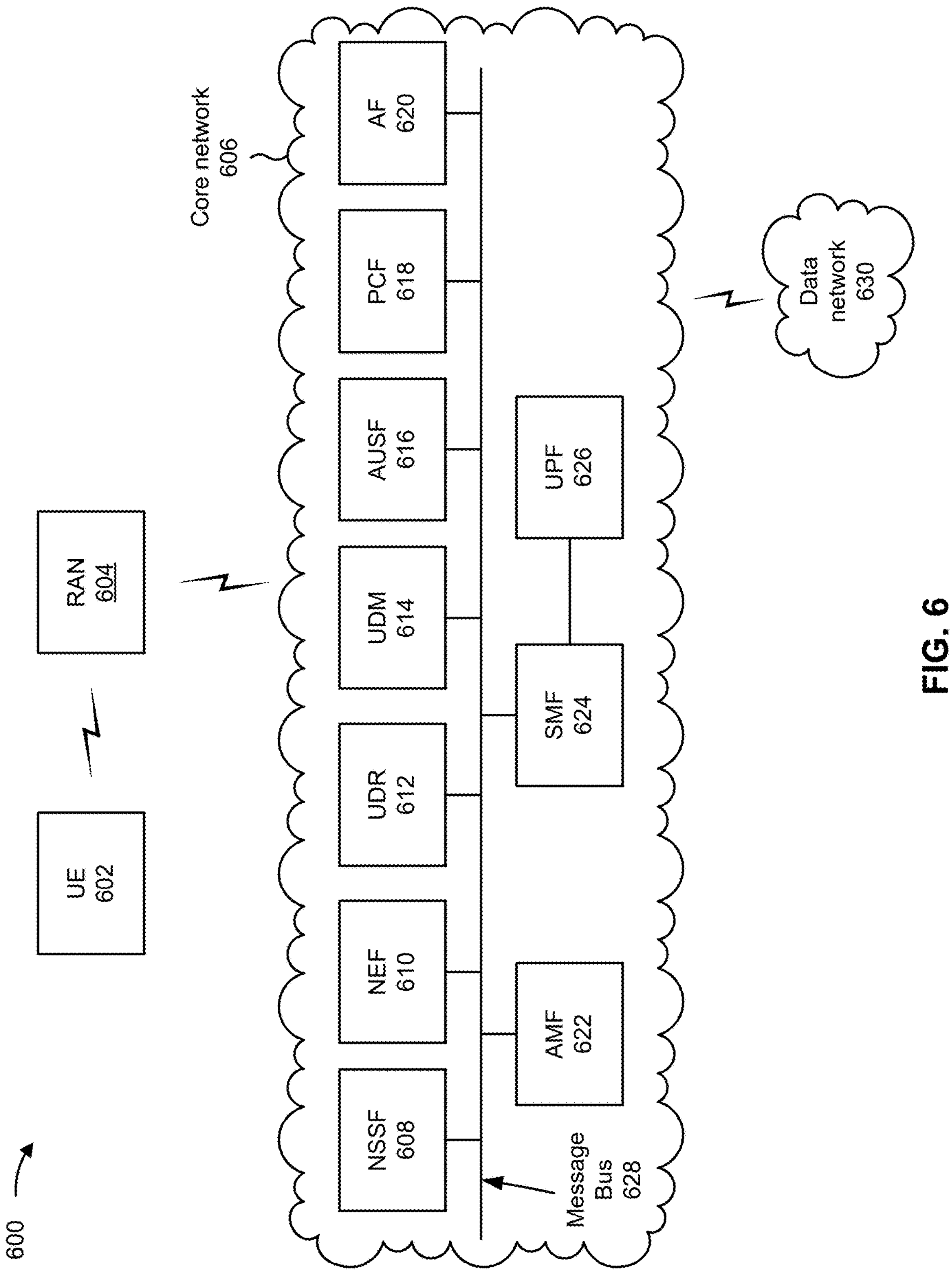
FIG. 6 is a diagram of an example environment in which systems and/or methods described herein may be implemented.

FIG. 6 is a diagram of an example environment 600 in which systems and/or methods described herein may be implemented. As shown in FIG. 6, example environment 600 may include a UE 602, a radio access network (RAN) 604, a core network 606, and a data network 630. Devices and/or networks of example environment 600 may interconnect via wired connections, wireless connections, or a combination of wired and wireless connections.

The UE 602 may include one or more devices capable of receiving, generating, storing, processing, and/or providing information, such as information described herein. For example, the UE 602 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 604 may support, for example, a cellular radio access technology (RAT). The RAN 604 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 602. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 604 may transfer traffic between the UE 602 (e.g., using a cellular RAT), one or more base stations (e.g., using a wireless interface or a backhaul interface, such as a wired backhaul interface), and/or the core network 606. The RAN 604 may provide one or more cells that cover geographic areas.

In some implementations, the RAN 604 may perform scheduling and/or resource management for the UE 602 covered by the RAN 604 (e.g., the UE 602 covered by a cell provided by the RAN 604). In some implementations, the RAN 604 may be controlled or coordinated by a network controller, which may perform load balancing, network-level configuration, and/or other operations. The network controller may communicate with the RAN 604 via a wireless or wireline backhaul. In some implementations, the RAN 604 may include a network controller, a self-organizing network (SON) module or component, or a similar module or component. In other words, the RAN 604 may perform network control, scheduling, and/or network management functions (e.g., for uplink, downlink, and/or sidelink communications of the UE 602 covered by the RAN 604).

In some implementations, the core network 606 may include an example functional architecture in which systems and/or methods described herein may be implemented. For example, the core network 606 may include an example architecture of a 5G next generation (NG) core network included in a 5G wireless telecommunications system. While the example architecture of the core network 606 shown in FIG. 6 may be an example of a service-based architecture, in some implementations, the core network 606 may be implemented as a reference-point architecture, among other examples.

As shown in FIG. 6, the core network 606 may include a number of functional elements. The functional elements may include, for example, a network slice selection function (NSSF) 608, a network exposure function (NEF) 610, a unified data repository (UDR) 612, a unified data management (UDM) 614, an authentication server function (AUSF) 616, a policy control function (PCF) 618, an application function (AF) 620, an access and mobility management function (AMF) 622, a session management function (SMF) 624, and/or a user plane function (UPF) 626. These functional elements may be communicatively connected via a message bus 628. Each of the functional elements shown in FIG. 6 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 608 may include one or more devices that select network slice instances for the UE 602. The NSSF 608 may allow an operator to deploy multiple substantially independent end-to-end networks potentially with the same infrastructure. In some implementations, each slice may be customized for different services. The NEF 610 may include one or more devices that support exposure of capabilities and/or events in the wireless telecommunications system to help other entities in the wireless telecommunications system discover network services.

The UDR 612 may include one or more devices that provide a converged repository, which may be used by network functions to store data. For example, a converged repository of subscriber information may be used to service a number of network functions. The UDM 614 may include one or more devices to store user data and profiles in the wireless telecommunications system. The UDM 614 may generate authentication vectors, perform user identification handling, perform subscription management, and perform other various functions. The AUSF 616 may include one or more devices that act as an authentication server and support the process of authenticating the UE 602 in the wireless telecommunications system.

The PCF 618 may include one or more devices that provide a policy framework that incorporates network slicing, roaming, packet processing, and/or mobility management, among other examples. The AF 620 may include one or more devices that support application influence on traffic routing, access to the NEF 610, and/or policy control, among other examples. The AMF 622 may include one or more devices that act as a termination point for non-access stratum (NAS) signaling and/or mobility management, among other examples. The SMF 624 may include one or more devices that support the establishment, modification, and release of communication sessions in the wireless telecommunications system. For example, the SMF 624 may configure traffic steering policies at the UPF 626 and/or may enforce UE internet protocol (IP) address allocation and policies, among other examples. The UPF 626 may include one or more devices that serve as an anchor point for intra-RAT and/or inter-RAT mobility. The UPF 626 may apply rules to packets, such as rules pertaining to packet routing, traffic reporting, and/or handling user plane QoS, among other examples. The message bus 628 may represent a communication structure for communication among the functional elements. In other words, the message bus 628 may permit communication between two or more functional elements.

The data network 630 may include one or more wired and/or wireless data networks. For example, the data network 630 may include an Internet Protocol multimedia subsystem (IMS), a PLMN, a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of example environment 600 may perform one or more functions described as being performed by another set of devices of example environment 600.

Figure 7:
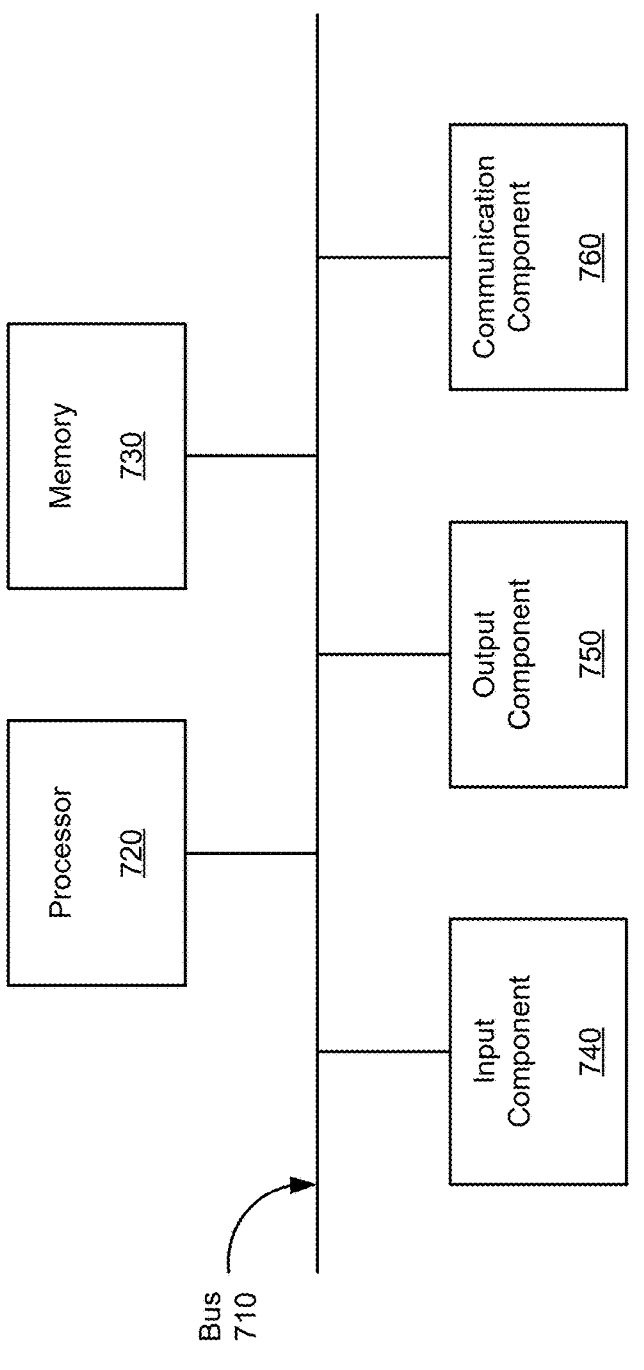
FIG. 7 is a diagram of example components of one or more devices of FIG. 6.

FIG. 7 is a diagram of example components of a device 700 associated with NF authorization for roaming between PLMNs. The device 700 may correspond to a SEPP-P (e.g., SEPP-P 108). In some implementations, the SEPP-P may include one or more devices 700 and/or one or more components of the device 700. Alternatively, the device 700 may correspond to an NF-C (e.g., NF-C 102), an NRF-InterPLMN-C (e.g., NRF-InterPLMN-C 104), a SEPP-C (e.g., SEPP-C 106), an NRF-P (e.g., NRF-P 110), or an NF-P (e.g., NF-P 112). As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
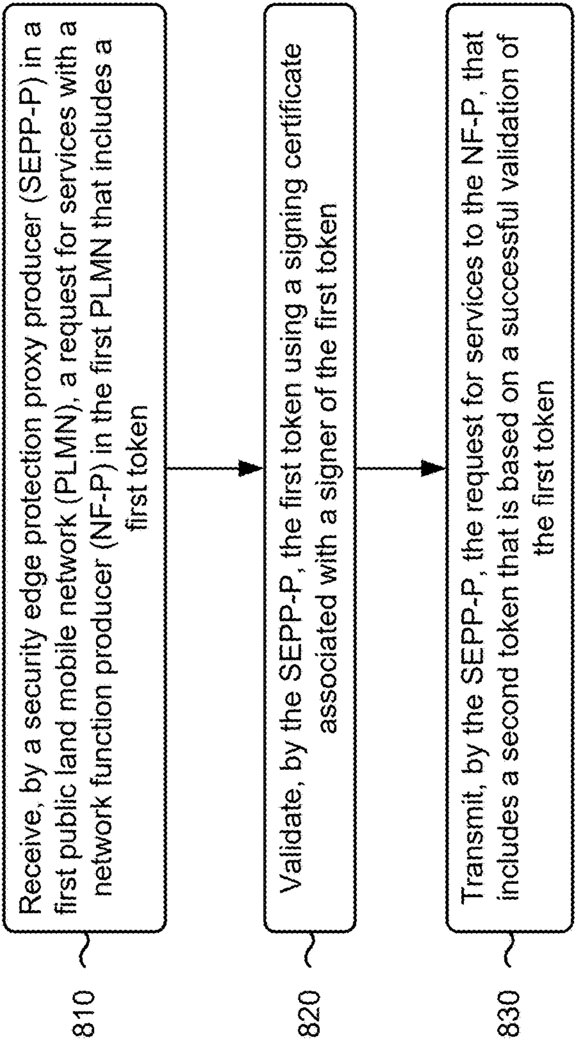
FIG. 8 is a flowchart of an example process associated with NF authorization for roaming between PLMNs.
Figure 8:

FIG. 8 is a flowchart of an example process 800 associated with NF authorization for roaming between PLMNs. In some implementations, one or more process blocks of FIG. 8 may be performed by a SEPP-P (e.g., SEPP-P 108). In some implementations, one or more process blocks of FIG. 8 may be performed by another entity or a group of entities separate from or including the SEPP-P (e.g., NF-C 102, NRF-InterPLMN-C 104, SEPP-C 106, NRF-P 110, or NF-P 112). Additionally, or alternatively, one or more process blocks of FIG. 8 may be performed by one or more components of device 700, such as processor 720, memory 730, input component 740, output component 750, and/or communication component 760.

As shown in FIG. 8, process 800 may include receiving, by the SEPP-P in a first PLMN, a request for services with an NF-P in the first PLMN, wherein the request for services includes a first token that is associated with an NF-C in a second PLMN (block 810). For example, the NF-C may provide the first token to the SEPP-P via the SEPP-C. In some implementations, the first token may be associated with an external third party entity that provides tokens as a service. In this example, the external third party entity may provide the first token to the NF-C, and then the NF-C may provide the first token to the SEPP-P via the SEPP-C.

As shown in FIG. 8, process 800 may include validating, by the SEPP-P, the first token using a signing certificate associated with a signer of the first token (block 820). The signer of the first token is a SEPP-C associated with the second PLMN, or alternatively, the signer of the first token may be an NRF inter-PLMN-C associated with the second PLMN. The NRF inter-PLMN-C may be co-located with the SEPP-C. The SEPP-P may be pre-provisioned with the signing certificate associated with the signer of the first token.

In some implementations, the SEPP-P may be configured to act as a token validation authority. The SEPP-P may be an only entity in the first PLMN that manages the signing certificate associated with the signer of the first token. The SEPP-C may be configured to act as an inter-PLMN token generation and provisioning authority.

As shown in FIG. 8, process 800 may include transmitting, by the SEPP-P, the request for services to the NF-P, wherein the request for services includes a second token that is based on a successful validation of the first token (block 830). A successful validation of the second token may enable the NF-P to provide a service to the NF-C based on an authorization of the NF-C during an inter-PLMN roaming. The NF-P may be able to provide the service to the NF-C until an expiry of the second token.

In some implementations, the SEPP-P may transmit, to the SEPP-C, signaling to negotiate one or more cryptographic algorithms that are allowed to be used by the SEPP-C. A cryptographic algorithm used to generate the first token may comply with the one or more cryptographic algorithms negotiated between the SEPP-P and the SEPP-C.

In some implementations, the first token indicates one or more of: the NF-C as a subject, the signer of the first token as an issuer, the NF-P and the SEPP-P as an audience, a signing certificate identifier, and a signature associated with the signer of the first token. The second token may indicate one or more of: the NF-C as a subject, the SEPP-P as an issuer, the NF-P as an audience, a signing certificate identifier, and a signature associated with the SEPP-P.

In some implementations, the first token and the second token may be combined into a single token. The single token may include a signature associated with the signer of the first token and a signature associated with the SEPP-P, and only the signature associated with the SEPP-P may be validated by the NF-P.

In some implementations, the SEPP-P may generate the second token based on the successful validation of the first token, where the second token may indicate the NF-P as an audience. The SEPP-P may sign the second token using a signing certificate associated with the SEPP-P. Alternatively, the SEPP-P may transmit, a message that requests a creation of the second token. The message may indicate that the second token is to include one or more of the SEPP-P and/or the NF-C as a subject, and that the second token is to include the NF-P as an audience. The SEPP-P may receive the second token from the NF-P.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device in a first public land mobile network (PLMN), a request for services with a network function producer (NF-P) in the first PLMN, wherein the request for services includes a first token that is associated with a network function consumer (NF-C) in a second PLMN;

validating, by the device, the first token using a signing certificate associated with a signer of the first token, and the signer of the first token is a second device associated with the second PLMN; and transmitting, by the device, the request for services to the NF-P, wherein the request for services includes a second token that is based on a successful validation of the first token, and a successful validation of the second token enables the NF-P to provide a service to the NF-C based on an authorization of the NF-C during an inter-PLMN roaming.

2. The method of claim 1, wherein the device is a security edge protection proxy producer (SEPP-P) and the second device is a security edge protection proxy consumer (SEPP-C) is configured to act as an inter-PLMN token generation and provisioning authority, and the SEPP-P is configured to act as a token validation authority.

3. The method of claim 1, wherein the device is pre-provisioned with the signing certificate associated with the signer of the first token.

4. The method of claim 2, wherein:

the first token indicates one or more of: the NF-C as a subject, the signer of the first token as an issuer, the NF-P and the SEPP-P as an audience, a signing certificate identifier, and a signature associated with the signer of the first token; and the second token indicates one or more of: the NF-C as a subject, the SEPP-P as an issuer, the NF-P as an audience, a signing certificate identifier, and a signature associated with the SEPP-P.

5. The method of claim 1, wherein the first token and the second token are combined into a single token, wherein the single token includes a signature associated with the signer of the first token and a signature associated with the device, and only the signature associated with the device is validated by the NF-P.

6. The method of claim 2, further comprising:

generating, by the SEPP-P, the second token based on the successful validation of the first token, wherein the second token indicates the NF-P as an audience; and signing, by the SEPP-P, the second token using a signing certificate associated with the SEPP-P.

7. The method of claim 2, further comprising:

transmitting, by the SEPP-P, a message that requests a creation of the second token, wherein the message indicates that the second token is to include one or more of the SEPP-P or the NF-C as a subject, and that the second token is to include the NF-P as an audience; and receiving, by the SEPP-P, the second token from the NF-P.

8. The method of claim 1, wherein the signer of the first token is a network repository function (NRF) inter-PLMN consumer associated with the second PLMN, and the NRF inter-PLMN consumer is co-located with the second device.

9. The method of claim 1, wherein the device is an only entity in the first PLMN that manages the signing certificate associated with the signer of the first token.

10. The method of claim 1, wherein the NF-P is able to provide the service to the NF-C until an expiry of the second token.

11. The method of claim 2, further comprising:

transmitting, by the SEPP-P, signaling to negotiate one or more cryptographic algorithms that are allowed to be used by the SEPP-C, wherein a cryptographic algorithm used to generate the first token complies with the one or more cryptographic algorithms negotiated between the SEPP-P and the SEPP-C.

12. The method of claim 1, wherein the first token is associated with an external third party entity that provides tokens as a service.

13. A device, comprising:

one or more processors configured to:

receive a request for services with a network function producer (NF-P) in a first public land mobile network (PLMN), wherein the request for services includes a first token that is associated with a network function consumer (NF-C) in a second PLMN;

validate the first token using a signing certificate associated with a signer of the first token, and the signer of the first token is a security edge protection proxy consumer (SEPP-C) associated with the second PLMN; and transmit the request for services to the NF-P, wherein the request for services includes a second token that is based on a successful validation of the first token, and a successful validation of the second token enables the NF-P to provide a service to the NF-C based on an authorization of the NF-C during an inter-PLMN roaming.

14. The device of claim 13, wherein the device is a security edge protection proxy producer (SEPP-P) in the first PLMN.

15. The device of claim 14, wherein the SEPP-C is configured to act as an inter-PLMN token generation and provisioning authority, and the SEPP-P is configured to act as a token validation authority.

16. The device of claim 14, wherein:

the first token indicates one or more of: the NF-C as a subject, the signer of the first token as an issuer, the NF-P and the SEPP-P as an audience, a signing certificate identifier, and a signature associated with the signer of the first token; and the second token indicates one or more of: the NF-C as a subject, the SEPP-P as an issuer, the NF-P as an audience, a signing certificate identifier, and a signature associated with the SEPP-P.

17. The device of claim 14, wherein the first token and the second token are combined into a single token, wherein the single token includes a signature associated with the signer of the first token and a signature associated with the SEPP-P, and only the signature associated with the SEPP-P is validated by the NF-P.

18. The device of claim 14, wherein the SEPP-P is pre-provisioned with the signing certificate associated with the signer of the first token, and the SEPP-P is an only entity in the first PLMN that manages the signing certificate associated with the signer of the first token.

19. The device of claim 13, wherein the NF-P is able to provide the service to the NF-C until an expiry of the second token.

20. A non-transitory computer-readable medium storing a set of instructions, the set of instructions comprising:

one or more instructions that, when executed by one or more processors of a device, cause the device to:

receive a request for services with a network function producer (NF-P) in a first public land mobile network (PLMN), wherein the request for services includes a first token that is associated with a network function consumer (NF-C) in a second PLMN;

validate the first token using a signing certificate associated with a signer of the first token, and the signer of the first token is a security edge protection proxy consumer (SEPP-C) associated with the second PLMN; and transmit the request for services to the NF-P, wherein the request for services includes a second token that is based on a successful validation of the first token, and a successful validation of the second token enables the NF-P to provide a service to the NF-C based on an authorization of the NF-C during an inter-PLMN roaming.

* * * * *